United States Patent

[11] 3,633,003

| [72] | Inventor | Manik Talwani |
| | | Valley Cottage, N.Y. |
| [21] | Appl. No. | 10,327 |
| [22] | Filed | Feb. 11, 1970 |
| [45] | Patented | Jan. 4, 1972 |
| [73] | Assignee | The United States of America as represented by the Secretary of the Navy |

[54] OFF-LEVELING COMPUTER
6 Claims, 3 Drawing Figs.

[52] U.S. Cl............................................235/150.25,
33/226 Z, 73/382, 73/504, 74/5, 74/5.4, 74/5.41,
235/151.3
[51] Int. Cl.............................................. G01c 19/54
[50] Field of Search............................................ 33/226 Z;
73/382, 504; 74/5, 5.4, 5.41, 5.6, 5.8, 5.9;
235/150.25, 151.3

[56] References Cited
UNITED STATES PATENTS
2,634,610  4/1953  Silverman.....................  73/382

| 3,250,133 | 5/1966 | Savet............................ | 73/382 X |
| 3,361,897 | 1/1968 | Rush............................. | 235/151.3 |
| 3,509,765 | 5/1970 | Stevenson et al............. | 33/226 Z X |

Primary Examiner—Eugene G. Botz
Assistant Examiner—R. Stephen Dildine, Jr.
Attorneys—R. S. Sciascia, L. I. Shrago and R. K. Tendler ABSTRACT: This invention describes an off-leveling computer which continuously corrects for the error induced in sea gravimetry measurements because the gravimeter measuring axis is not aligned with the local vertical at all times. The apparatus computes the error in the measurement of the local gravitational acceleration due to off-leveling of a stable platform on which the gravimeter is mounted by first determining the sum of the angular positioning errors induced by the servo loop and the gyro erection system. It then computes the component of the horizontal acceleration which, by virtue of this error in verticality, is along the gravimeter measuring axis. This computed signal is then subtracted from the gravimeter signal to eliminate errors in the measurement of gravitational acceleration due to the misalignment of the gravimeter with the local vertical.

INVENTOR.
MANIK TALWANI

OFF-LEVELING COMPUTER

The invention described herein may be manufactured and used by or for the Government of the United States of America for governmental purposes without the payment of any royalties thereon or therefor.

This invention relates to a system for eliminating system-induced error in measurement of local gravitational fields at sea and, more particularly, to an off-leveling computer which generates an error signal corresponding to the acceleration error induced in the measurement of local gravitational accelerations when an off-leveled gravimeter is subjected to horizontal accelerations.

When the gravimeter is subjected to horizontal accelerations, off-leveling of the gyrostabilized platform on which the gravimeter is mounted causes errors in the output of the gravimeter. These errors arise because horizontal accelerations which would not normally affect measurement of a vertical acceleration such as gravity appear in the output of the gravimeter. These horizontal accelerations arise from horizontal movements of the ship in which the gravimeter is mounted. If the gravimeter is off-leveled, there will be a component of this acceleration along the measuring axis of the gravimeter. This additional acceleration must be subtracted from the output of the gravimeter so that the gravimeter output will be responsive only to vertical or gravitational accelerations. The component of the horizontal acceleration along the gravimeter measuring axis is simulated by the subject computer by sensing the component of the horizontal acceleration in a plane perpendicular to the measuring axis of the gravimeter and by multiplying this acceleration by the sine of the off-leveling angle. This provides a signal which when subtracted from the output of the gravimeter gives the correct value of a local gravitational field.

In normal applications, a gravimeter is mounted on a gyrostabilized platform aboard a seagoing vessel. In order to achieve accurate gravity measurement, this platform must be kept perfectly horizontal as the vessel is subjected to pitching and rolling action and to horizontal accelerations. Modern gyrocoupled servosystems do not preserve perfect horizontality of the platform because of certain limitations inherent in these systems. Two errors which arise in leveling the gyrostabilized platform are the errors due to the servo loop response time and the gyroerection loop error which results from the inability of the gyroaxis to maintain the local vertical at all times.

When the platform is caused to move from the horizontal, an angle develops between the axis of the gyro and the vertical axis of the platform. An electrical signal corresponding to this angle drives torque motors coupled to the platform, and the gimbaled platform returns to its original position. Errors in servosystems are always present, and the platform axis lags behind the gyroaxis. This lag is variously known as the "servo error" or the "followup error." This would be the only error if the gyroaxis always followed the local vertical. It does not do so because of free drift of the gyro as well as the rotation of the earth. Hence, a primary vertical reference, generally composed of orthogonally oriented horizontal accelerometers mounted on the inner gimbal of the gyroscope, is used to provide a reference direction for the gyro. Once the gyrorotor is spun up in a vertical direction to form a gyroaxis, these accelerometers define a horizontal plane for the gyro. If the gyroscope is subjected to horizontal accelerations, the gyromotor and the inner gimbal are off-leveled, thus disturbing the primary vertical reference. This off-leveling is sensed by the accelerometers which generate a signal proportional to the off-leveling which drives the torquers to realign the gyrorotor with the initial vertical direction. Circuitry is provided to filter and amplify the signal from these accelerometers so that the appropriate amount of torque can be provided. The accelerometer, circuitry and torquers from the gyroerection loop when coupled to the gyrogimbals. In the absence of horizontal accelerations, the accelerometer provides a perfect vertical reference and the gyroerection error is zero. However, the horizontal accelerations, in effect, give rise to tilt errors. These are attenuated by the erection loop circuitry but not completely eliminated and, therefore, give rise to the gyroerection error. This error constitutes the first error in the leveling of the gyrostabilized platform. The total off-leveling error results from the gyroerection error and the servosystem response error and is called the "off-leveling error."

In order to eliminate the off-leveling error from the gravimeter measurement, the additional acceleration caused by the off-leveling error must be subtracted from the local gravitational acceleration. When the component of the horizontal acceleration lying in the plane of the platform is multiplied by the sine of the off-leveling angle, an error signal is produced which is the portion of the off-leveling acceleration in the direction of the gravimeter measuring axis. When this portion is subtracted from the output of the gravimeter, an accurate reading of the local gravitational field may be obtained. It will be appreciated that the acceleration sensed in the plane of the platform differs very little from the true horizontal acceleration for small off-leveling angles. This component will thus be referred to as the horizontal acceleration $\ddot{x}$.

The departure of the platform from the horizontal may be represented by the pitch of the platform $\alpha(t)$ and its roll $\beta(t)$, the angles $\alpha$ and $\beta$ being measured in two orthogonal directions about the horizontal plane. If the acceleration in one of these orthogonal directions, for example, along the ship's fore and aft axis, is $\ddot{x}(t)$, the required error to be computed is $\ddot{x}(t) \sin \alpha(t)$ which reduces to $\ddot{x}(t) \alpha(t)$ since the pitch error $\alpha(t)$ is usually small. The surge acceleration in this X direction is obtained from an accelerometer mounted on the stable platform. The sway acceleration $\ddot{y}(t)$ and the roll error $\beta(t)$ give rise to the error $\ddot{y}(t) \beta(t)$ which is similarly computed. Because of the similarity of $\ddot{x}(t) \alpha(t)$ and $\ddot{y}(t) \beta(t)$, as far as the analog computation is concerned, only the calculation of and correction for $\ddot{x}(t) \alpha(t)$ will be described. The calculation of and correction for $\ddot{y}(t) \beta(t)$ is exactly similar.

In order to make a computation of the accelerations to be subtracted from the output of the gravimeter, the total off-leveling angle must be known and available as a signal. This signal is the sum of the servo loop errors and the gyroerection loop errors, i.e., the sum of the angular off-leveling errors introduced by each of these loops. The angular error induced by the play in and the response time of the servosystem is available as an output signal from the servosystem itself. Gyroerection errors are not available as an output of the gyro. A system has been devised to generate such an output without disturbing the operation of the gyro by simulating the gyroerection loop. This produces the same signal that is coupled to the torquers to erect the gyro. The response of the gyro to this signal is simulated by an integration circuit. This integration circuit when coupled to the simulated gyroerection loop produces a signal which is equal to the instantaneous angular error between the gyrorotor axis and the local vertical.

In the present system, the erection loop error signal is generated by reproducing the filter network which is utilized by the gyro and by representing the response of the gyro by an integration circuit. The angular error due to the servosystem and the angular erection error are summed and multiplied with the surge or sway acceleration to provide the total off-leveling acceleration error. This error is filtered appropriately by a low-pass filter and is subtracted from the gravimeter signal.

It is therefore an object of this invention to provide a system for generating a signal corresponding to the off-leveling acceleration error induced by a gyrostabilized sea gravimeter platform.

It is a further object of this invention to provide a system for eliminating the error in the measurement of gravity at sea due to the off-leveling of the stable platform on which the gravity sensing device is mounted, caused by ship motions.

It is still another object of this invention to generate a gyroerection loop error signal by reproducing the filter network which filters the erection signal to the gyro and by simulating the gyro by an integration circuit.

Other objects, advantages and novel features of the invention will become apparent from the following detailed description thereof when considered in conjunction with the accompanying drawings in which like numerals represent like parts throughout and wherein.

Figure 1:
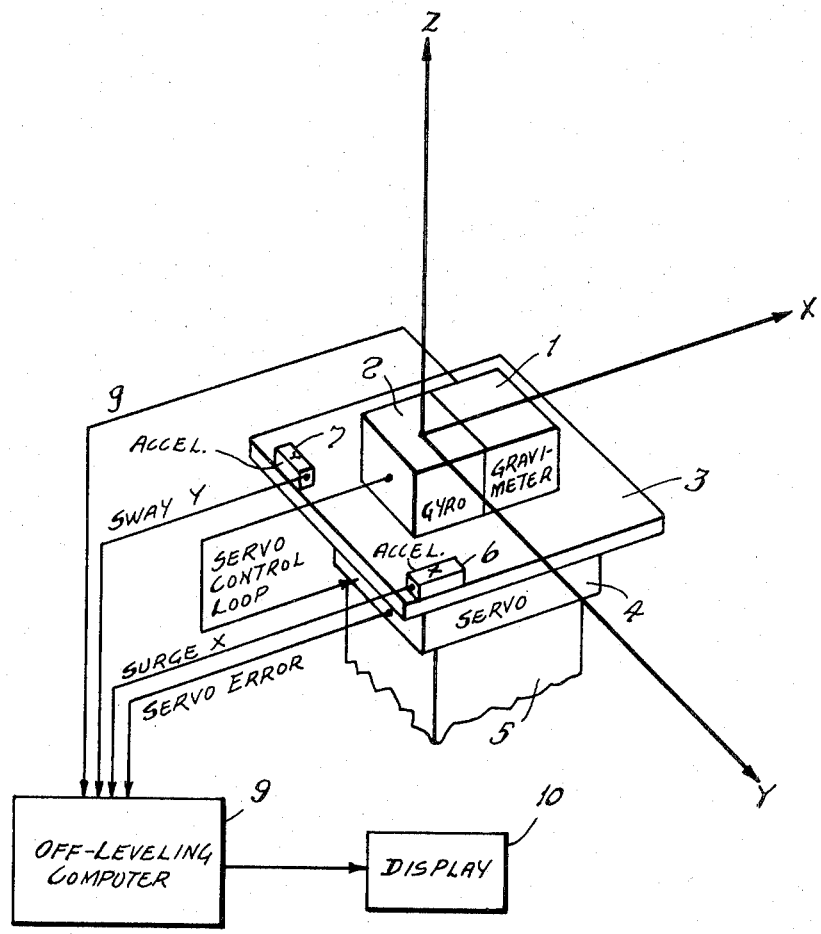
FIG. 1 is a diagram showing the mounting of a gravimeter on a stable platform and including a showing of the gyroscope and the servomechanism for maintaining the platform in a horizontal position.

Referring to FIG. 1, a gravimeter 1 is shown mounted alongside a gyroscope 2. This type of mounting requires that the axis of the accelerometer in the gravimeter be aligned with the axis of the active member of the gyroscope once this active member is spun up in a predetermined direction. This predetermined direction is a direction Z perpendicular to the horizontal plane defined by orthogonal axes X and Y. Direction Z is then the local vertical. Stable platform 3 is maintained in this horizontal plane by servomechanism 4 which may be any of a gimbaled type of mechanical device. Inherent in all of these mechanical devices is both a lag time and, for geared platforms, a backlash which causes a certain amount of play in the positioning of the platform. This error is predictable and is generally available from commercial servosystems as an error signal whose amplitude represents the angular error in the positioning of the platform. This servosystem is mounted on a support member 5 which is generally secured to the hull of a ship. Servomechanism 4 is designed to allow relative movement between the platform and the support member.

Mounted on platform 3 are accelerometers 6 and 7. These accelerometers are oriented so that they respond to accelerations in the X and Y directions, respectively. These directions are colinear with the directions of the accelerometers in the gyroscope which produce signals which erect the gyro when it is subjected to horizontal forces. Accelerometers 6 and 7 thus duplicate the accelerometers in gyroscope 2; and, as such, the outputs of these accelerometers are used to duplicate the outputs of the gyroerection accelerometers. These accelerometers thus provide appropriate signals for the gyroerection error signal generator to be described hereinafter.

Figure 2:
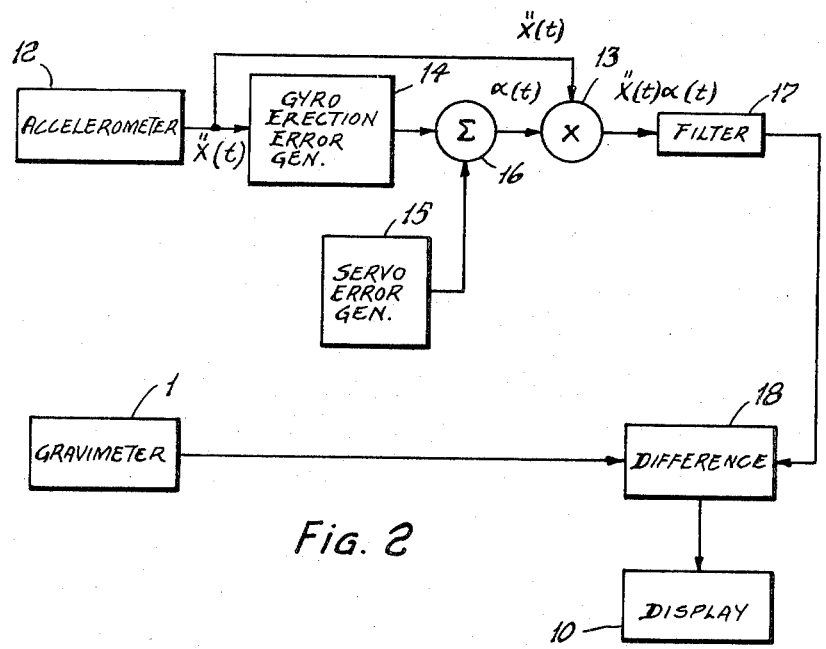
FIG. 2 is a block diagram of the off-leveling computer.

FIG. 1 also shows the outputs of the gravimeter, the gyroscope, accelerometers 6 and 7 and the servomechanism. These outputs, to be described in connection with FIG. 2, are shown coupled to off-leveling computer 9 which eliminates the above-mentioned errors from the accelerations signal g, generated by the gravimeter. The corrected signal is shown coupled to a display device 10 which may be any electromechanical display, most usually a strip chart recorder.

FIG. 2 is a block diagram showing the system identified at number 9 in FIG. 1. The system utilizes the signals from one of accelerometers 6 or 7, the error signal from the servosystem and the signal from the gravimeter. As shown, the system in FIG. 2 generates a signal corresponding to the angular error in one of the two orthogonal, horizontal directions shown in FIG. 1. It will be appreciated that an exact duplicate of the system shown feeding difference detector 18 would generate an error signal corresponding to the angular error in the other of the orthogonal directions. Two systems coupled to orthogonally oriented accelerometers and feeding difference detector 18 are thus capable of eliminating the above-mentioned errors arising from off-leveling in any horizontal direction.

Accelerometer 12, which corresponds to either of accelerometers 6 or 7 in FIG. 1, is shown generating an output signal corresponding to the acceleration in either the X or Y direction. This output signal is used, for example, as the surge acceleration $\ddot{x}(t)$ which is multiplied by the sine of the total angular off-leveling error, sin $\alpha(t)$ at multiplier 13. Because $\alpha(t)$ is relatively small, little error is introduced by multiplying $\ddot{x}(t)$ by $\alpha(t)$. The $\alpha(t)$ signal is the combined erection error signal generated by analog gyroerection error generator 14 and the servo loop error produced by servo error generator 15. These two error signals are summed by a conventional adder at 16. The multiplied resultant signal from 13 is filtered by a low-pass filter 17 to duplicate the filtering of the gravimeter signal. This filtered signal is subtracted at 18 from the signal generated by gravimeter 1 of FIG. 1. The difference signal generated at 18 is coupled to display device 10, described in FIG. 1.

This difference signal is composed of the original signal from the gravimeter from which is subtracted the component of the acceleration due to the off-leveling errors mentioned above.

Figure 3:
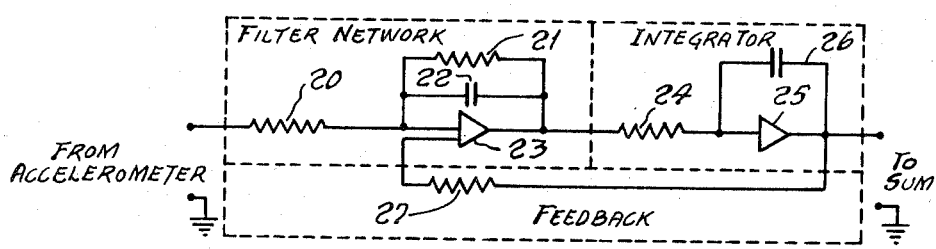
FIG. 3 is a schematic diagram of the circuit which produces the analog gyroerection error signal in the computer shown in FIG. 2.

FIG. 3 shows a circuit which simulates the angular error encountered when the active member of the gyro, the rotor, is erected or returned to its original spin up position. The gyroerection system normally employs a network to filter the signals from its internal accelerometers which serve as the primary vertical reference. The error signal in the subject circuit is produced by duplicating this filter network and coupling the outputs of accelerometers 6 or 7 to this filter. This filtered signal is integrated in the subject circuit which simulates the response of the gyro. The output of the integrator is the analog of the angular error induced in the gyroerection system.

The circuit is constructed as follows. The aforementioned filter network is, in one instance, a simple RC network composed of resistor 21 and capacitor 22 in the feedback path of operational amplifier 23 which is fed by input resistor 20. This circuit duplicates the filter network in one type of commercially available network used in the erection of the gyro. It will be appreciated that any filter network may be used so long as it duplicates the filtering network utilized by the gyroscope. The output of this filter is coupled through resistor 24 to a simple integrating circuit composed of an operational amplifier 25 with a capacitor 26 in its feedback path. Feedback resistor 27 is employed to make the network stable, the feedback voltage being added at the input of amplifier 23 in a differential mode. An alternative method of achieving stability is to employ a resistor in parallel with capacitor 26, the feedback loop employing resistor 27 being taken out of the circuit. A number of other variations of the circuit shown in FIG. 3 are possible as long as they duplicate the response in the gyroerection loop. The purpose of any of these variations is to analog the gyroerection loop for accelerations having periods between 1 and 20 seconds with acceptable approximation.

What is claimed is:

1. Apparatus for computing error in the measurement of gravity due to off-leveling of a gravimeter mounted on a platform which employs a gyroscope mounted thereon and a servosystem linked to said gyroscope for maintaining the horizontality of said platform, comprising:

means for computing the angular error in the alignment of the measuring axis of said gravimeter in a predetermined direction with respect to the local vertical and for generating a first signal having an amplitude corresponding to the magnitude of said angular error;

means for sensing accelerations to which said gravimeter is subjected, occurring in a plane perpendicular to the measuring axis of said gravimeter in said predetermined direction and for producing a second signal having an amplitude proportional to the acceleration sensed; and means for multiplying said first signal by said second signal to produce a third signal whose amplitude is the product of the angular off-leveling error and the acceleration sensed, whereby said third signal represents the error in acceleration detected by said gravimeter due to off-leveling in said predetermined direction.

2. The apparatus as recited in claim 1 wherein an error signal whose amplitude is equal to the instantaneous angular error introduced by said servosystem is available as an output thereof and wherein said means for computing and generating a signal whose amplitude is proportional to the angular error in alignment between said measuring axis and said local vertical includes:

means for producing a fourth signal whose amplitude is equal to the instantaneous angular deviation of the spin axis of said gyroscope from the local vertical in said predetermined direction; and means for adding said fourth signal to the error signal available at the output of said servosytem.

3. The apparatus as recited in claim 2 wherein said predetermined direction is in the direction of maximum off-leveling of said platform.

4. The apparatus as recited in claim 2 wherein said predetermined direction is one of two orthogonally oriented directions used in combination in determining the total off-leveling of said platform in the direction of maximum off-leveling.

5. Apparatus for computing error in the measurement of gravity due to off-leveling of a gravimeter which is subjected to horizontal accelerations and which is mounted on a gyrostabilized platform and for removing this error from the gravity measurement, comprising:

means for computing the angular off-leveling of said gravimeter in a predetermined direction and for generating a first signal having an amplitude equal to the angular magnitude of said off-leveling;

means for sensing accelerations to which said gravimeter is subjected in said predetermined direction and for providing a second signal having an amplitude proportional to the acceleration sensed;

means for multiplying said first signal with said second signal to produce a third signal whose amplitude is the product of the angle of said off-leveling and the acceleration sensed; and means for subtracting said third signal from the output signal generated by said gravimeter, whereby whenever said gravimeter is off-leveled and subjected to horizontal accelerations in said predetermined direction, errors in acceleration induced along the measuring axis of said gravimeter are removed from the gravity measurement.

6. Apparatus for eliminating off-leveling error introduced into the measurement of gravity at sea by the motion of a seagoing vessel comprising:

a gyrostabilized platform mounted within said vessel having a gyroscope mounted on said platform, initially oriented with its spin axis perpendicular to the plane of said platform when said platform is horizontal, whereby said spin axis is colinear with the local vertical, and having a servosystem linked to said gyroscope for maintaining the horizontality of said platform when said vessel is subjected to sea motions and which produces a servo loop error signal whose amplitude is proportional to the instantaneous positioning error introduced by said servosystem in returning said platform to a horizontal position, said gyroscope having an orthogonally oriented pair of accelerometers carried on one of its gimbals such that said pair of accelerometers defines a primary horizontal reference plane and including both motor means for changing the orientation of the inner and outer gimbals which support the rotating member of said gyroscope, and gyroerection circuitry coupled to the outputs of said accelerometers and said motor means for producing two signals, one of which controlling the outer gimbal of said gyroscope in response to the output of one of said accelerometers, and the other of which controlling the inner gimbal of said gyroscope in response to the output of the other of said accelerometers, thereby controlling the position of said spin axis in two orthogonal directions such that when said spin axis is made to deviate from the local vertical by horizontal accelerations, it is restored to said local vertical by said gyroerection circuitry and said motor means operating in response to the sensing of horizontal accelerations by said accelerometers;

a gravimeter mounted on said platform and oriented so that its measuring axis is perpendicular to the plane of said platform for producing an output signal whose amplitude is proportional to accelerations having components along its measuring axis;

a second pair of accelerometers, identical to those carried by said gyroscope, mounted on said platform in the same orthogonal directions as those accelerometers carried by said gyroscope whereby this second pair of accelerometers duplicates the accelerometers carried by said gyroscope;

circuit means identical to said gyroerection circuitry and coupled to the outputs of said second pair of accelerometers for producing two additional signals respectively corresponding to the two signals generated by said gyroerection circuitry for controlling the movement of the inner and outer gimbals of said gyroscope;

means for integrating each of these two additional signals over time so as to analog the response of the gyroscope to the two signals from said gyroerection circuitry;

means for adding said servo loop error signal to each of said integrated signals so as to produce two off-leveling error signals corresponding respectively to the angular off-leveling error in each of said orthogonal directions;

means for multiplying the off-leveling error signal representing the off-leveling error in one of said orthogonal directions by the output of the accelerometer of the second pair oriented in this orthogonal direction and for multiplying the other off-leveling error signal by the output of the accelerometer of the second pair oriented in the other orthogonal direction; and means for subtracting both of said multiplied signals from the output of said gravimeter so as to provide a corrected signal corresponding to the local gravitational field whereby accelerations due to off-leveling of said platform are removed from the output of said gravimeter.

* * * * *